(12) United States Patent
Saito et al.

(10) Patent No.: US 7,491,906 B2
(45) Date of Patent: Feb. 17, 2009

(54) SEAT BELT APPARATUS

(75) Inventors: Kentarou Saito, Kanagawa (JP); Ganta Hibata, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/013,794

(22) Filed: Jan. 14, 2008

(65) Prior Publication Data

US 2008/0116044 A1 May 22, 2008

Related U.S. Application Data

(63) Continuation of application No. PCT/JP2006/311005, filed on Jun. 1, 2006.

(30) Foreign Application Priority Data

Jul. 14, 2005 (JP) .............................. 2005-206053

(51) Int. Cl.
*H01H 9/00* (2006.01)
(52) U.S. Cl. .................. 200/61.58 B; 200/61.58 R; 242/382.2; 280/805
(58) Field of Classification Search .......... 200/61.58 B, 200/61.58 R; 242/379.1, 382.2, 390.8; 280/805–806; 180/268
See application file for complete search history.

(56) References Cited

U.S. PATENT DOCUMENTS 3,767,134 A * 10/1973 Morales ................ 200/61.58 B

| 4,483,494 A | * | 11/1984 | Takada ........................ 242/372 |
| 4,754,105 A | * | 6/1988 | Doty et al. ............ 200/61.58 B |
| 5,769,345 A | * | 6/1998 | Morner et al. ........... 242/375.3 |
| 5,944,135 A | * | 8/1999 | Blackburn et al. .......... 180/268 |
| 6,641,078 B2 | * | 11/2003 | Palliser .................... 242/382.2 |

FOREIGN PATENT DOCUMENTS

| JP | 2 18136 A | 1/1990 |
| JP | 2 133960 UM A | 5/1990 |
| JP | 50 77775 UM A | 10/1993 |
| JP | 2002 308046 A | 10/2002 |

* cited by examiner

*Primary Examiner*—Kyung Lee
(74) *Attorney, Agent, or Firm*—Brinks Hofer Gilson & Lione

(57) ABSTRACT

In a seat belt apparatus, a first projecting portion and a second projecting portion which are capable of being brought into abutment with each other so that a switch lever is shifted from a switch OFF position to a switch ON position are provided on a side of a drive gear and a side of a first gear, respectively. A third projecting portion and a fourth projecting portion, which are capable of being brought into abutment with each other so that the switch lever is shifted from the switch ON position to the switch OFF position, are provided on the side of the first gear and a side of a second gear. An abutment position between the first and second projecting portions and an abutment position between the third and fourth projecting portions differ from each other in an axial direction of a spindle.

4 Claims, 6 Drawing Sheets

SEAT BELT APPARATUS

CROSS REFERENCE TO RELATED APPLICATIONS

This application claims priority to JP 2005-206053, filed Jul. 14, 2005 and PCT/JP2006/31105, filed Jun. 1, 2006.

FIELD OF INVENTION

The present invention relates to a seat belt apparatus, and more particularly to a seat belt apparatus which can detect when a seat belt is being worn by an occupant of a vehicle, otherwise referred to as a wearing state.

BACKGROUND OF THE INVENTION

In a conventional seat belt apparatus, there is known a construction in which a remainder switch for outputting an ON/OFF signal for detecting a wearing or non-wearing state of a seat belt is disposed inside of a seat belt retractor mounted in a vehicle. A wearing state of the seat belt occurs when the seat belt is worn by an occupant of the vehicle so as to securely position and restrain the occupant within a seat of the vehicle.

In the seat belt apparatus, three gears, which are linked with the rotation of a spindle, are provided, and projecting portions which are formed on sides of the gears are brought into abutment with each other, to thereby drive a switch lever which is adapted to switch on or off the reminder switch.

In the conventional seat belt apparatus, a projecting portion on the gear, disposed at a middle of the three gears, is brought into abutment with a projecting portion on one of the remaining gears so as to shift the switch when the belt is pulled out, while the projecting portion is brought into abutment with a projecting portion on the other gear to shift the switch when the belt is retracted. Therefore, a deviation in the shifting position of the switch may be produced between when the belt is pulled out and when the belt is retracted. Thus, it may be required that the reminder switch is shifted properly even in a maximum retracting position when the occupant is restrained.

On the other hand, the two projecting portions may be provided on the gear disposed in middle the positions where the projecting portions are proximate the projecting portions of the remaining two gears in the shift positions. In this case, however, there may be a possibility that the projecting portions interfere with each other unintentionally at a certain number of revolutions.

SUMMARY OF THE INVENTION

In at least one embodiment of the present invention, the object is to provide a highly reliable seat belt apparatus which can reduce the extent of deviation in retracting the seat belt webbing when the switch is shifted or between when the seat belt webbing is retracted and when the webbing is pulled out and which can prevent the unintentional interference between the projecting portions when the seat webbing is pulled out or retracted.

The object of the invention may be attained by the following configurations.

A seat belt apparatus including: a rotatable spindle around which a webbing is wound; a drive gear to which the rotation of the spindle is transmitted; a switch which outputs an ON/OFF signal according to a belt-worn-state or a belt-not-worn-state; a switch lever which can oscillate to a first position and a second position in order to shift the switch; a first gear which meshes with the drive gear and oscillates together with the switch lever; and a second gear which meshes with the first gear; wherein a first projecting portion and a second projecting portion are provided on a side of the drive gear and a side of the first gear, respectively, which are capable of being brought into abutment with each other so that the switch lever is shifted from the first position to the second position; a third projecting portion and a fourth projecting portion are provided on the side of the first gear and a side of the second gear, respectively, which are capable of being brought into abutment with each other so that the switch lever is shifted from the second position to the first position; and an abutment position between the first and second projecting portions and an abutment position between the third and fourth projecting portions differ from each other in an axial direction of the spindle.

In one aspect, the second projecting portion is formed closer to the side of the first gear than the third projecting portion; and that one of the third and fourth projecting portions has a recessed portion through which either of the first and second projecting portions passes.

In another aspect, the third projecting portion is formed closer to the side of the first gear than the second projecting portion; and one of the first and second projecting portions has a recessed portion through which either of the third and fourth projecting portions passes.

In yet another aspect, the seat belt apparatus further includes an automatic locking retractor adapted to be actuated by performing a predetermined webbing pull-out operation and to realize a prevention of rotation of the spindle in a webbing pull-out direction under a normal operation, and the prevention of rotation of the spindle in the webbing pull-out direction is cancelled while the switch lever is being shifted from the second position to the first position.

In at least one embodiment of the present invention, the first projecting portion and the second projecting portion are provided on the side of the drive gear and the side of the first gear, respectively, which are capable of being brought into abutment with each other so that the switch lever is shifted from the first position to the second position. The third projecting portion and the fourth projecting portion are provided on the side of the first gear and the side of the second gear, respectively, which are capable of being brought into abutment with each other so that the switch lever is shifted from the second position to the first position. The abutment position between the first and second projecting portions and the abutment position between the third and fourth projecting portions differ from each other in the axial direction of the spindle. This configuration may provide a highly reliable seat belt apparatus which can reduce the extent of deviation in retracting the seat belt webbing when the switch is shifted or between when the webbing is retracted and when the webbing is pulled out and which can prevent the unintentional interference between the projecting portions when the webbing is pulled out or retracted.

DETAILED DESCRIPTION

Hereinafter, a seat belt apparatus according to an embodiment of the invention will be described in detail by reference to the drawings.

Figure 1:
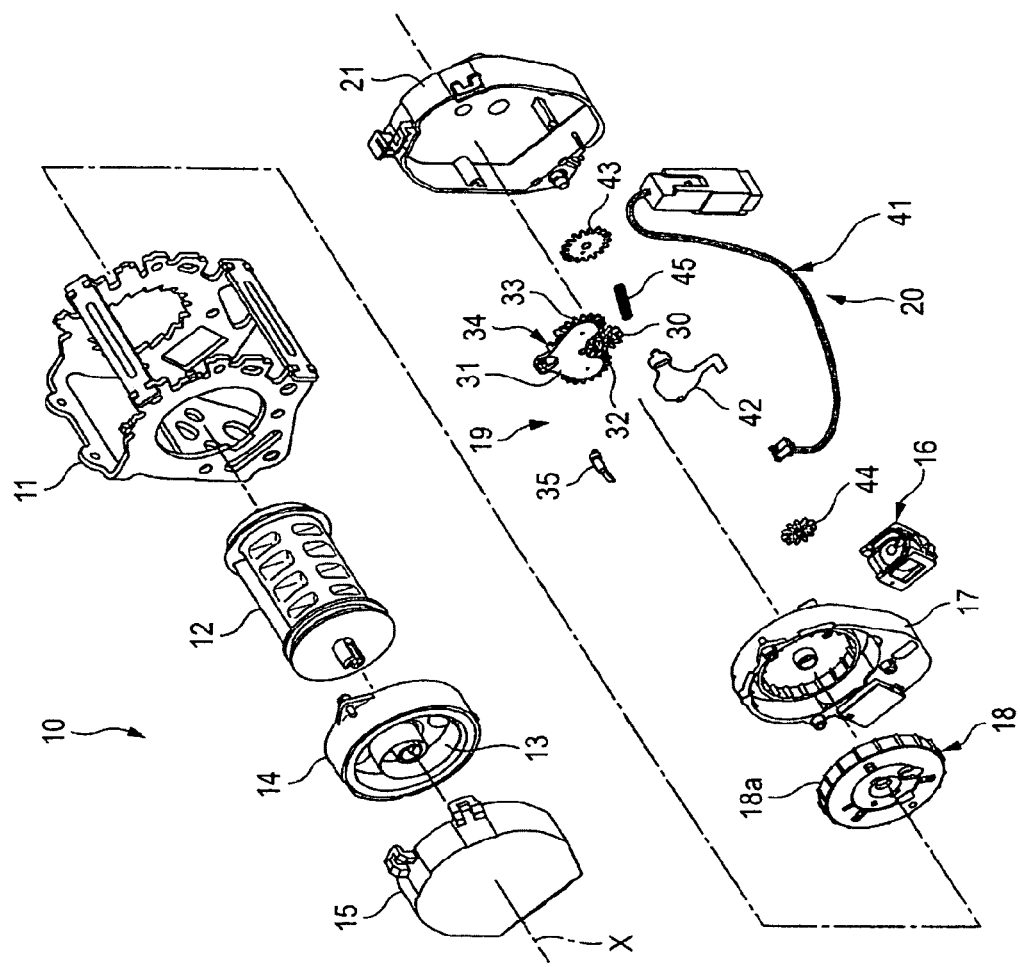
FIG. 1 is an exploded perspective view which illustrates constituent components of a seat belt apparatus in accordance with at least one embodiment of the present invention.

A seat belt retractor 10, which is a seat belt apparatus according to an embodiment of the invention, includes, as shown in FIG. 1, a retractor frame 11, and a spindle 12 for winding therearound webbing (not shown) is supported rotatably in the retractor frame 11.

A retractor spring 13 for biasing the spindle 12 in a seat belt winding direction is attached to the retractor frame 11 by a holder 14 and a cover 15 at one axial end side of the spindle.

Provided at the other axial end side of the spindle 12 are an acceleration sensor 16, which is provided in such a manner as to be tilted about a horizontal axis within the seat belt retractor 10 for detecting a horizontal acceleration of a vehicle, an inertia element assembly 18, which is disposed within a bearing plate 17 for locking a pull-out operation of a seat belt according to an acceleration detected by the acceleration sensor 16, an automatic locking retractor (ALR) 19, which is actuated by performing a predetermined webbing pull-out operation for realizing the prevention of rotation of the spindle 12 in a webbing pull-out direction under a normal operation, and a switch mechanism 20 (a so-called reminder switch), which are accommodated in a cover 21.

Figure 2A:
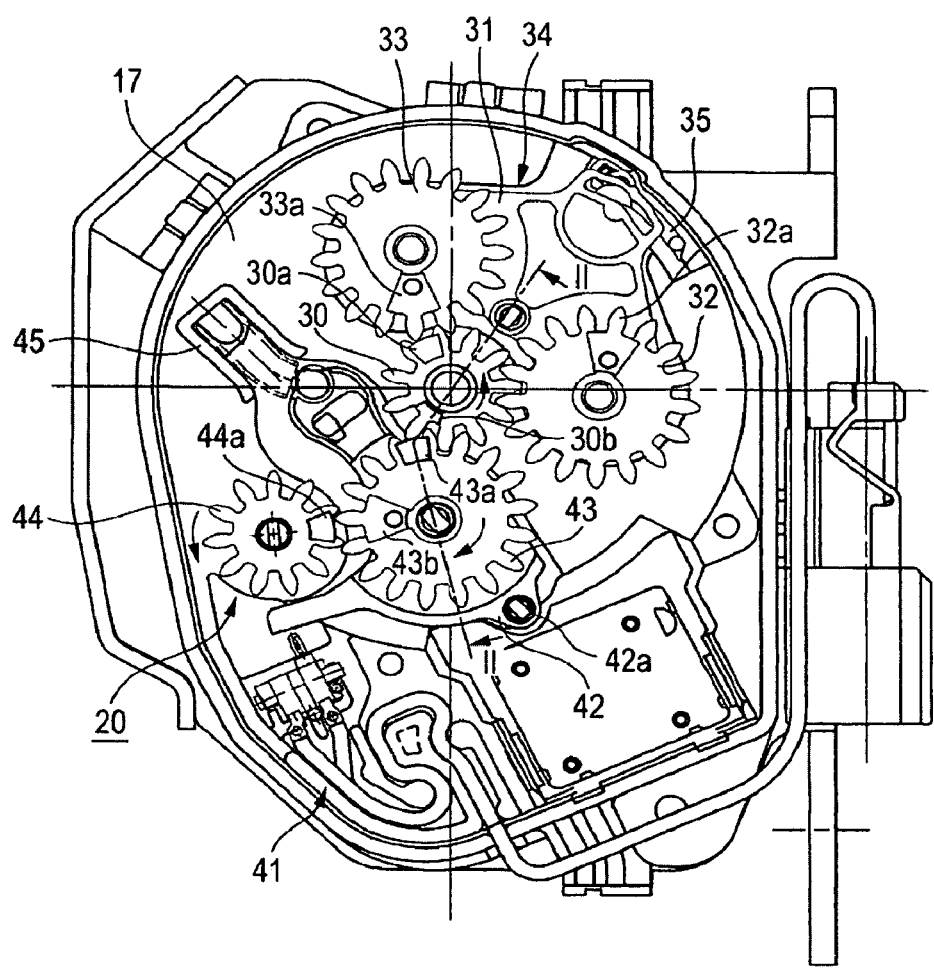
FIG. 2(a) is a diagram showing a state in which a first switch projecting portion and a second switch projecting portion are brought into abutment with each other in accordance with at least one embodiment of the present invention.

As shown in FIGS. 1 and 2, the automatic locking retractor 19 includes a drive gear 30 to which the rotation of the spindle 12 is transmitted, an ALR lever 31 which is supported in the bearing plate 17 in such a manner as to freely oscillate, an automatic locking retractor assembly 34 including two ALR gears 32 and 33, which are supported rotatably on the ALR lever 31, and a pawl 35, which engages with or disengages from a ratchet wheel 18a of the inertia element assembly 18 in response to the oscillation of the ALR lever 31.

A first ALR projecting portion 30a, which is formed into a sector, is provided on a side of the drive gear 30, and a second ALR projecting portion 32a which is brought into abutment with the first ALR projecting portion 30a and a third ALR projecting portion 33a are provided on sides of the ALR gears 32 and 33, respectively. In addition, when a predetermined webbing pull-out operation is performed, the ALR lever 31 oscillates by the first ALR projecting portion 30a and the second ALR projecting portion 32a being brought into abutment with each other, and the pawl 35 is brought into engagement with the ratchet wheel 18a, whereby it becomes in a locked state. On the other hand, when a predetermined webbing retracting operation is performed, the ALR lever 31 oscillates by the first ALR projecting portion 30a and the third ALR projecting portion 33a being brought into abutment with each other, and the pawl 35 is made to disengage from the ratchet wheel 18a, whereby the locking is released.

The switch mechanism 20 includes the drive gear 30, a switch assembly 41, which outputs an ON/OFF signal according to a belt-worn-state or belt-not-worn state, a switch lever 42, which can oscillate or shift between a first position where the switch is OFF and a second position where the switch is ON in order to shift the switch assembly 41, a first switch gear 43, which meshes or engages with the drive gear 30 and oscillates together with the switch lever 42, a second switch gear 44, which meshes or engages with the first switch gear 43, and a coil spring 45, which is held in the bearing plate 17 and is locked on the switch lever 42 at one end thereof.

A first switch projecting portion 30b is formed on the side of the drive gear 30 in a different position from the first ALR projecting portion 30a in a circumferential direction. A second switch projecting portion 43a and a third switch projecting portion 43b are formed on a side of the first switch gear 43 in different positions in a circumferential direction. In addition, a fourth switch projecting portion 44a is formed on a side of the second switch gear 44.

The first switch projecting portion 30b and the second switch projecting portion 43a shift the switch lever 42 from the switch OFF position to the switch ON position by being brought into abutment with each other. In addition, the third switch projecting portion 43b and the fourth switch projecting portion 44a shift the switch lever 42 from the switch ON position to the switch OFF position by being brought into abutment with each other.

Here, an abutment position between the first switch projecting portion 30b and the second switch projecting portion 43a and an abutment position between the third switch projecting portion 43b and the fourth switch projecting portion 44a are different from each other in an axial direction of the spindle 12. Specifically, as shown in FIGS. 2(b), 3(b) and 5(b), in the second switch projecting portion 43a and the third switch projecting portion 43b which are formed on the first switch gear 43, the second switch projecting 43a is formed lower and closer to the side of the first switch gear 43 than the third switch projecting portion 43b.

Figure 2B:
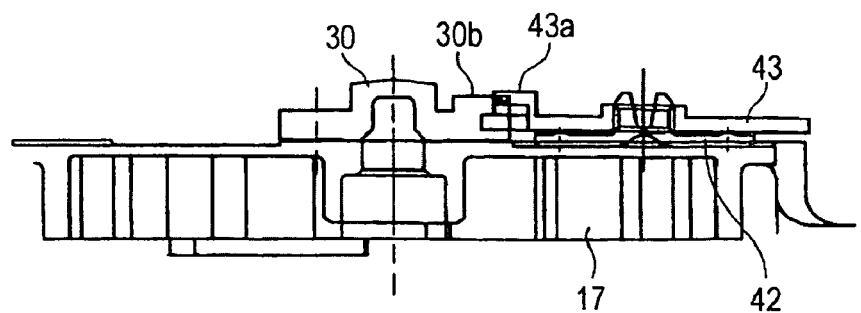
FIG. 2(b) is a sectional view taken along the line II-II depicted in FIG. 2(a)

Due to this, the first switch projecting portion 30b, which is brought into abutment with the second switch projecting portion 43a, is formed to have substantially the same axial position (or, as in this embodiment, slightly lower than) as the second switch projection 43a (refer to FIG. 2(b)). In addition, the fourth switch projecting portion 44a which is brought into abutment with the third switch projecting portion 43b is also formed to have substantially the same (or, as in this embodiment, slightly lower than) axial position as the third switch projecting portion 43b (refer to FIG. 3(b)).

Figure 5A:
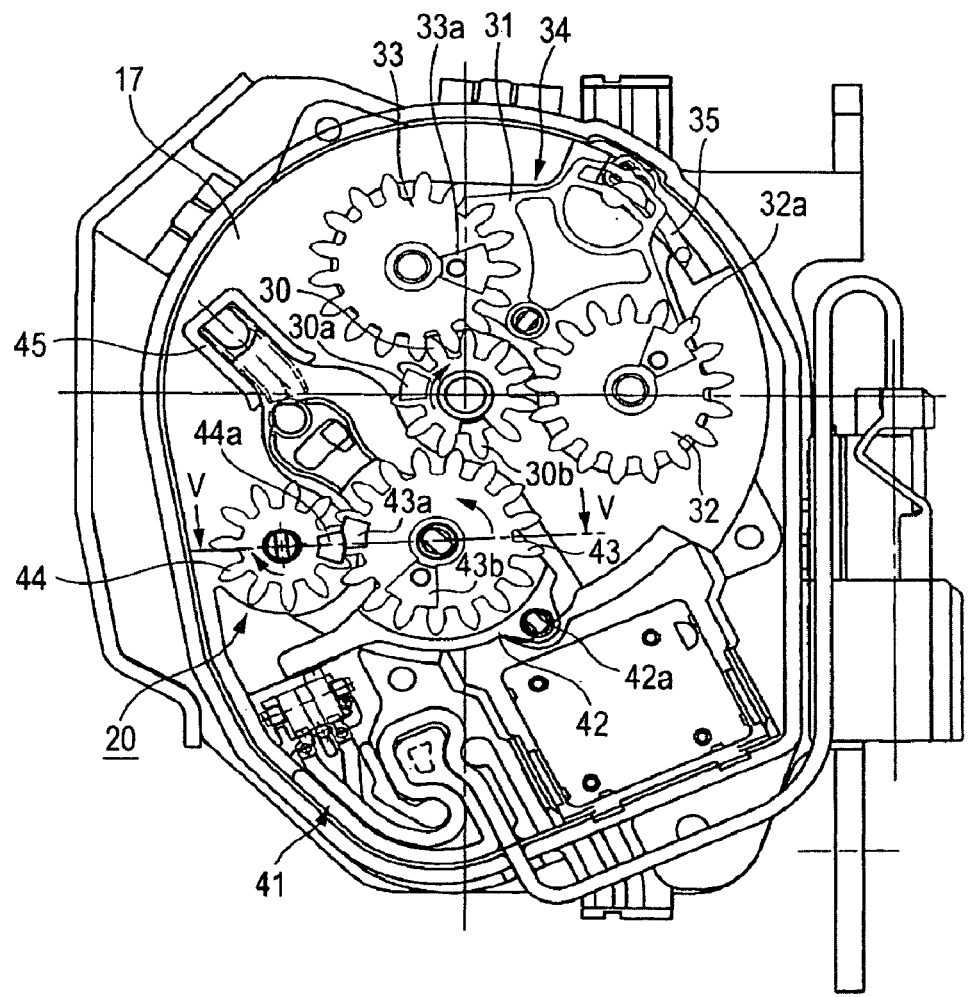
FIG. 5(a) is a diagram showing a state in which the second switch projecting portion and the fourth switch projecting portion pass by without interference at a point in time at which the drive gear completes its second rotation in accordance with at least one embodiment of the present invention.
Figure 5B:
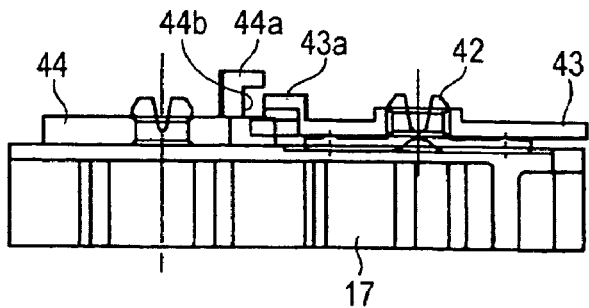
FIG. 5(b) is a sectional view taken along the line V-V depicted in FIG. 5(a)

Furthermore, the fourth switch projecting portion 44a has an outward recessed portion 44b and is, hence, formed into an L-shaped cross section and prevents the interference of the fourth switch projecting portion 44a with the second switch projecting portion 43a by the second switching projecting portion 43a passing through the interior of the recessed portion 44b when the drive gear completes a predetermined number of times of rotation (in this embodiment, a second rotation from a state in which the seat belt has been pulled out to its full amount) (refer to FIG. 5(b)).

Note that in this embodiment, the first switch projecting portion is provided in the same position as a tooth of the drive gear 30. In addition, the second switch projecting portion 43a is provided between adjacent teeth of the first switch gear 43, and the third switch projecting portion 43b is provided in the same position as a tooth of the first switch gear 43. Furthermore, the fourth switch projecting portion 44a is provided between adjacent teeth of the second switch gear 44.

Next, referring to from FIG. 2 to FIG. 5, a shifting operation of the switch mechanism 20 will be described. As shown in FIG. 2, when operating the webbing to pull it out, the first switch projecting portion 30b and the second switch projecting portion 43a are brought into abutment with each other in a position where the drive gear 30 completes for example a tenth rotation when the webbing is pulled out to its full amount. Then, the switch lever 42 oscillates or rotates around an oscillation center 42a to pass over a shifting point of the coil spring 45, when the switch lever 42 moves to the switch ON position, whereby the switch mechanism 20 is shifted to ON.

Figure 3A:
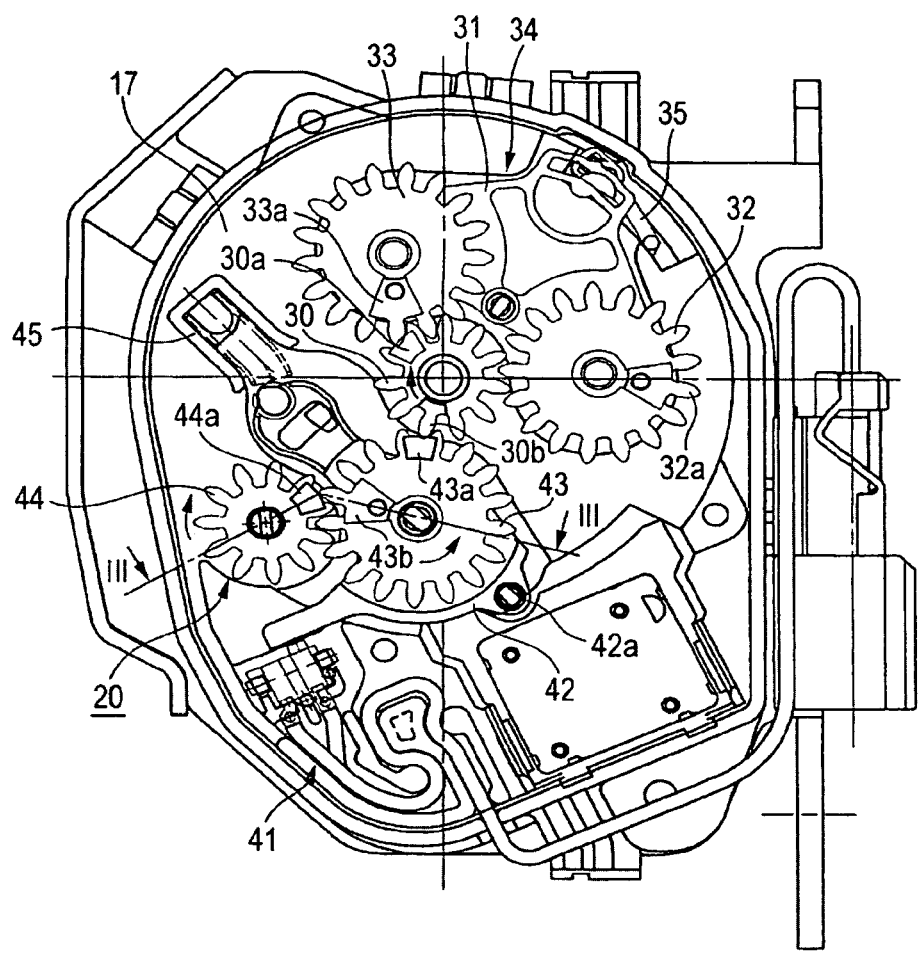
FIG. 3(a) is a diagram showing a state in which a third switch projecting portion and a fourth switch projecting portion are brought into abutment with each other in accordance with at least one embodiment of the present invention.
Figure 3B:
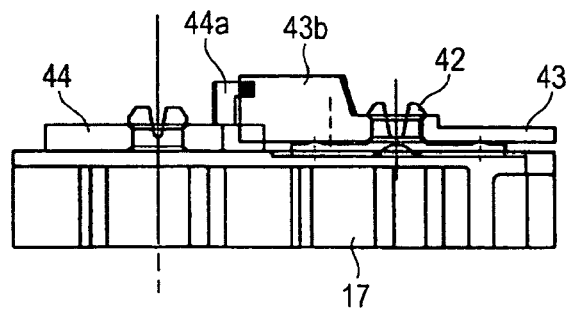
FIG. 3(b) is a sectional view taken along the line III-III depicted in FIG. 3(a)

On the other hand, as shown in FIG. 3, when operating the webbing to retract it, the third switch projecting portion 43b and the fourth switch projecting portion 44a are brought into abutment with each other in a position where the drive gear 30 completes for example a tenth rotation from a state in which the webbing is pulled out to its full amount. Then, the switch lever 42 oscillates or rotates around the oscillation center 42a to pass over the shifting point of the coil spring 45, when the switch lever 42 moves to the switch OFF position, whereby the switch mechanism 20 is shifted to OFF.

Figure 4:
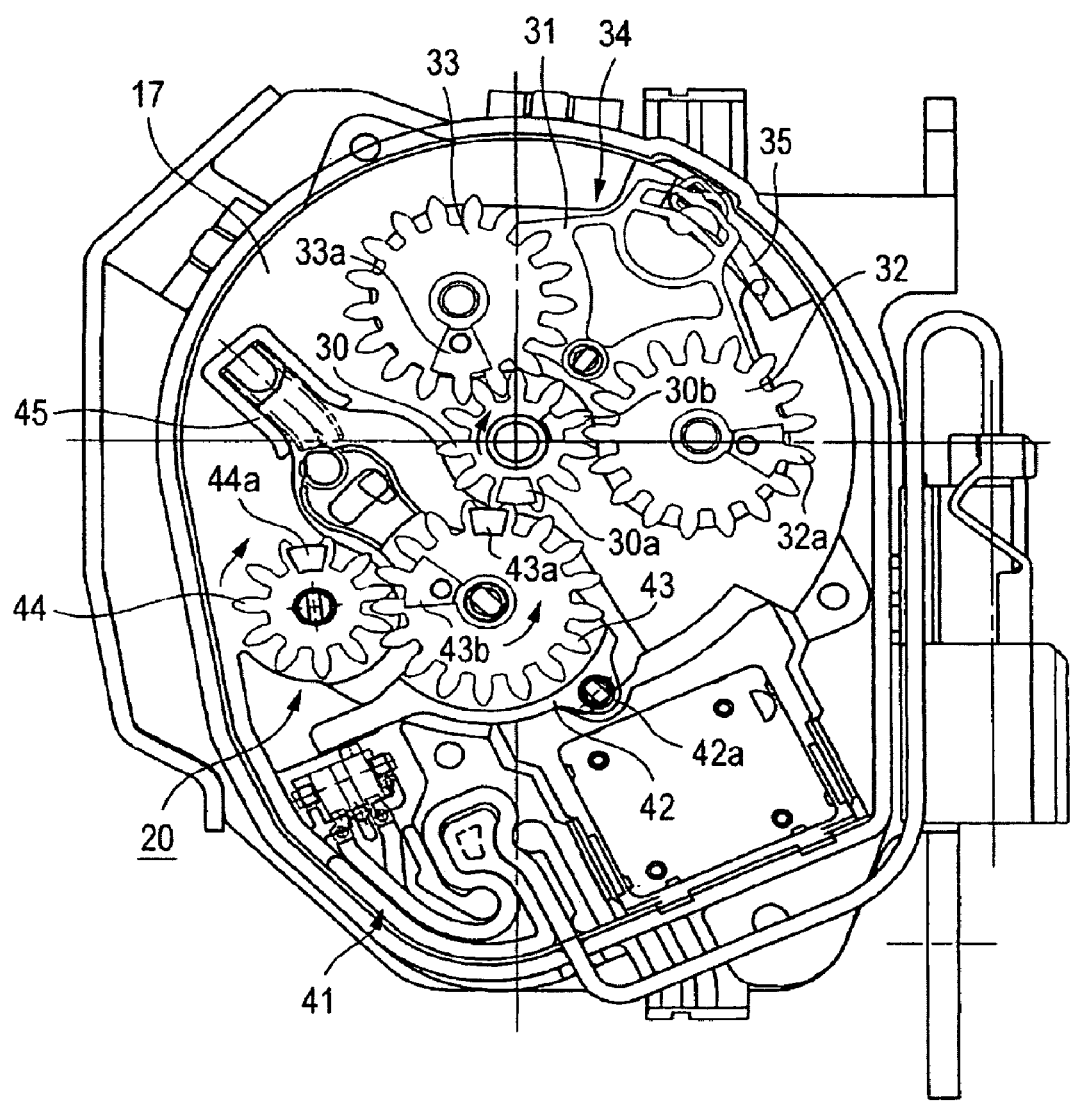
FIG. 4 is a diagram showing a state in which a first ALR projecting portion and the second switch projecting portion approach and pass by at a point in time at which the drive gear completes its first rotation in accordance with at least one embodiment of the present invention.

In addition, as shown in FIG. 4, when operating the webbing to retract it and when the drive gear 30 completes for example a first rotation (or, depending on a specification, a first rotation and a fifteenth rotation) from a state in which the webbing is pulled out to its full amount, although the first ALR projecting portion 30a and the second switch projecting portion 43a rotate pass each other, they are not brought into abutment with each other because in the switch ON state, the first switch gear 43 lies closer to the second switch gear 44 together with the switch lever 42.

In addition, as shown in FIG. 5, when operating the webbing to retract it, when the drive gear 30 completes for example a second rotation from a state in which the webbing is pulled out to its full amount, although the second switch projecting portion 43a and the fourth switch projecting portion 44a overlap each other as viewed from the top, as has been described in the foregoing paragraphs, the second switch projecting portion 43a passes through the interior of recessed portion 44b of the fourth switch projecting portion 44a so that the switch projecting portion 43a and the fourth switch projecting portion 44a are not brought into abutment with each other.

Figure 6:
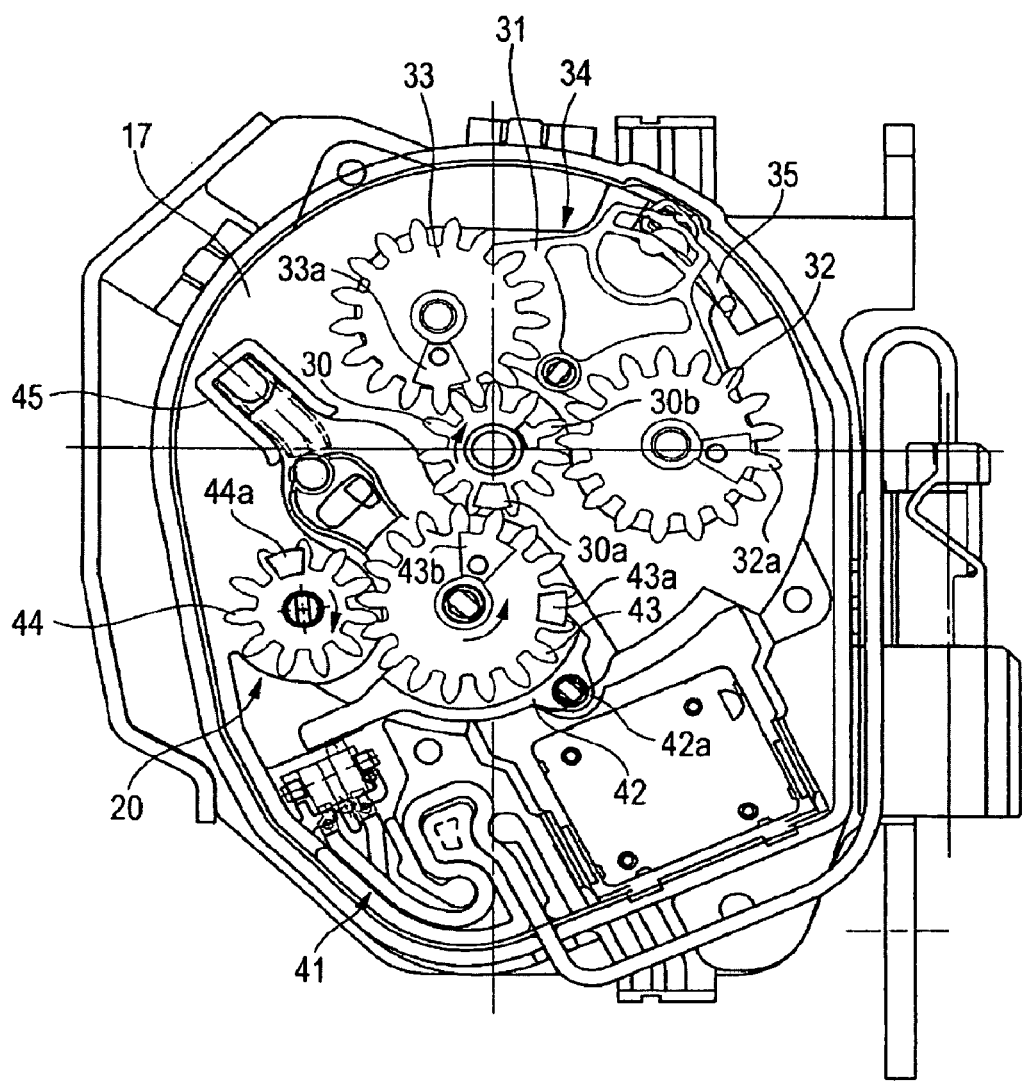
FIG. 6 is a diagram showing a state in which the third switch projecting portion and the first ALR projecting portion approach and pass by at a point in time at which the drive gear completes its tenth rotation in accordance with at least one embodiment of the present invention.

Furthermore, as shown in FIG. 6, when operating the webbing to retract it, before the shifting to the switch OFF position occurs in FIG. 3 and when the drive gear 30 completes for example a tenth rotation from a state in which the webbing is pulled out to its full amount, the third switch projecting portion 43b and the first ALR projecting portion 30a rotate pass each other because the first switch gear 43 lies closer to the second switch gear 44 such that the third switch projecting portion 43b and the first ALR projecting portion 30a are not brought into abutment with each other.

By this means, the extent of deviation in retracting the webbing when the switch mechanism 20 is shifted or between when the webbing is retracted and when the webbing is pulled out can be reduced. In addition, the switch mechanism 20 can be shifted in an ensured fashion within a range from the fully retracted state to the maximum retracting amount (for example, the occupant is a six-year-old child, the seat is slid to a rear position, and the head restraint is lowered to its lowest position). In addition, when the webbing is pulled out or retracted, an unintentional interference between the projecting portions may be prevented, thereby making it possible to provide a highly reliable seat belt apparatus.

In another example and as shown in FIG. 3, after the third switch projecting portion 43b and the fourth switch projecting portion 44a are brought into abutment with each other, where the switch lever 42 has passed over the shifting point of the coil spring 45 and is moving to the switch OFF position, the first ALR projecting portion 30a of the drive gear 30 and the third ALR projecting portion 33a of the ALR gear 33 of the automatic locking retractor 19 are brought into abutment with each other, whereby the prevention of rotation of the spindle 12 in the webbing pull-out direction is cancelled.

By this means, the shifting of the switch mechanism 20 and the canceling operation of the automatic locking retractor are performed substantially at the same time. For example, in the event that the webbing is pulled out to its full amount when worn by a six-year-old child so as to actuate the automatic locking retractor 19 and then the webbing is retracted to restore the normal wearing state, the automatic locking retractor 19 can be released.

Note that the invention is not such as to be limited to the embodiment that has been described heretofore but can be modified as required without departing from the spirit and scope of the invention.

While in this embodiment, the recessed portion 44b is formed in the fourth switch projecting portion 44a, instead, a recessed portion may be provided in the third switch projecting portion 43b, so as to avoid the interference with the first switch projecting portion 30b.

In addition, in the event that the third switch projecting portion 43b is formed to lie closer to the side of the first switch gear 43 than the second switch projecting portion 43a, one of the first and second switch projecting portions 30b and 43a may be configured to have a recessed portion through which either of the third and fourth switch projecting portions 43b and 44a passes.

Furthermore, the first to fourth switch projecting portions 30b, 43a, 43b and 44a may be formed integrally with the drive gear 30, the first switch gear 43 and the second switch gear 44, respectively, or may be mounted thereon as separate members.

The subject patent application is based on the Japanese Patent Application (No. P. 2005-206053) filed on Jul. 14, 2005 and all the contents thereof are incorporated herein by reference.

As a person skilled in the art will appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. A seat belt apparatus comprising:
   a rotatable spindle around which a webbing is wound;
   a drive gear that is driven by rotation of the spindle;
   a switch configured to be shifted and outputting an ON/OFF signal in response to at least one of a belt-worn-state and a belt-not-worn-state;

a switch lever configured for shifting to a first position and a second position so as to shift the switch;

a first gear which engages the drive gear and oscillates together with the switch lever;

a second gear which engages the first gear;

a first projecting portion and a second projecting portion are provided on a side of the drive gear and a side of the first gear, respectively, the first and second projecting portions configured to be brought into abutment with each other so that the switch lever is shifted from the first position to the second position;

a third projecting portion and a fourth projecting portion are provided on the side of the first gear and a side of the second gear, respectively, the third and fourth projecting portions configured to be brought into abutment with each other so that the switch lever is shifted from the second position to the first position; and an abutment position between the first and second projecting portions and an abutment position between the third and fourth projecting portions differ from each other in an axial direction of the spindle so as to prevent unintentional interference between the projecting portions.

2. The seat belt apparatus as set forth in claim 1, wherein the second projecting portion is formed closer to the side of the first gear than the third projecting portion, and one of the third and fourth projecting portions has a recessed portion through which either of the first and second projecting portions passes.

3. The seat belt apparatus as set forth in claim 1, wherein the third projecting portion is formed closer to the side of the first gear than the second projecting portion and one of the first and second projecting portions has a recessed portion through which either of the third and fourth projecting portions passes.

4. The seat belt apparatus as set forth in claim 1, wherein the seat belt apparatus further comprises an automatic locking retractor configured to be actuated by performing a predetermined webbing pull-out operation and to prevent rotation of the rotatable spindle in a webbing pull-out direction under a normal operation, and the prevention of rotation of the rotatable spindle in the webbing pull-out direction is cancelled while the switch lever is being shifted from the second position to the first position.

* * * * *